US009786300B2

(12) United States Patent
Chan et al.

(10) Patent No.: US 9,786,300 B2
(45) Date of Patent: Oct. 10, 2017

(54) SINGLE-SIDED SPEECH QUALITY MEASUREMENT

(75) Inventors: Wai-Yip Chan, Kingston (CA); Tiago H Falk, St. Hubert (CA); Qingfeng Xu, Waterloo (CA)

(73) Assignee: Avaya, Inc., Basking Ridge, NJ (US)

( * ) Notice: Subject to any disclaimer, the term of this patent is extended or adjusted under 35 U.S.C. 154(b) by 445 days.

(21) Appl. No.: 13/195,338

(22) Filed: Aug. 1, 2011

(65) Prior Publication Data

US 2011/0288865 A1 Nov. 24, 2011

Related U.S. Application Data

(63) Continuation of application No. 11/364,252, filed on Feb. 28, 2006, now abandoned.

(51) Int. Cl.

| | |
|---|---|
| ***G10L 25/00*** | (2013.01) |
| ***G10L 25/69*** | (2013.01) |
| ***H04M 1/24*** | (2006.01) |
| ***H04M 3/22*** | (2006.01) |

(52) U.S. Cl.

CPC .................................... *G10L 25/69* (2013.01)

(58) Field of Classification Search

CPC .......... G10L 25/00; G10L 25/69; H04M 1/24; H04M 3/22

USPC .... 704/200.1, 208, 210, 214, 215, 228, 233; 379/1.02

See application file for complete search history.

(56) References Cited

U.S. PATENT DOCUMENTS

| | | | | |
|---|---|---|---|---|
| 6,609,092 | B1 * | 8/2003 | Ghitza et al. | 704/226 |
| 7,313,517 | B2 * | 12/2007 | Beerends et al. | 704/200 |
| 7,406,419 | B2 * | 7/2008 | Malfait | 704/270 |
| 7,856,355 | B2 * | 12/2010 | Kim | 704/228 |
| 8,682,650 | B2 * | 3/2014 | Gray | G10L 25/69 379/1.02 |
| 2006/0200346 | A1 * | 9/2006 | Chan | G10L 25/69 704/233 |
| 2009/0018825 | A1 * | 1/2009 | Bruhn et al. | 704/222 |

OTHER PUBLICATIONS

Chen et al., "Bayesian Model Based Non-Intrusive Speech Quality Evaluation", IEEE International Conference on Acoustics, Speech, and Signal Processing, 2005. Proceedings. (ICCASP '05), Mar. 18-23, 2005, pp. 385-388.*

(Continued)

*Primary Examiner* — Martin Lerner

(57) ABSTRACT

A non-intrusive speech quality estimation technique is based on statistical or probability models such as Gaussian Mixture Models ("GMMs"). Perceptual features are extracted from the received speech signal and assessed by an artificial reference model formed using statistical models. The models characterize the statistical behavior of speech features. Consistency measures between the input speech features and the models are calculated to form indicators of speech quality. The consistency values are mapped to a speech quality score using a mapping optimized using machine learning algorithms, such as Multivariate Adaptive Regression Splines ("MARS"). The technique provides competitive or better quality estimates relative to known techniques while having lower computational complexity.

14 Claims, 1 Drawing Sheet

(56) References Cited

OTHER PUBLICATIONS

Picovici et al., "New output-based perceptual measure for predicting subjective quality of speech", IEEE International Conference on Acoustics, Speech, and Signal Processing, 2004. Proceedings. (ICASSP '04), May 17-24, 2004, vol. 5, pp. V-633 to V-636.*

Zha et al., "A data mining approach to objective speech quality measurement", IEEE International Conference on Acoustics, Speech, and Signal Processing, 2004. Proceedings. (ICASSP '04), May 17-24, 2004, vol. 1, pp. I-461-I-464.*

Chen et al., "Nonintrusive speech quality evaluation using an adaptive neurofuzzy inference system", IEEE Signal Processing Letters, May 2005, vol. 12, Issue 3, pp. 403 to 406.*

Wang et al., "Objective speech quality assessment with non-intrusive method for narrowband speech", 9th International Conference on Signal Processing, 2008. ICSP 2008. Oct. 26 to 29, 2008, pp. 518 to 521.*

Gray et al., "Non-intrusive speech-quality assessment using vocal tract models", IEE Proceedings—Vision, Image and Signal Processing, Dec. 2000, vol. 147, Issue 6, pp. 493 to 501.*

Li et al., "Output-based objective speech quality measurement using continuous hidden Markov Models", Seventh International Symposium on Signal Processing and its Applications, 2003, Proceedings, Jul. 1 to 4, 2003, vol. 1, pp. 389 to 392.*

Hermansky et al., "Perceptually based linear predictive analysis of speech", IEEE International Conference on Acoustics, Speech, and Signal Processing, ICASSP '85, Apr. 1985, pp. 509 to 512.*

D.-S. Kim, "ANIQUE: An Auditory Model for Single-Ended Speech Quality Estimation", IEEE Transactions on Speech and Audio Processing, Sep. 2005, vol. 13, Issue 5, pp. 821 to 831.*

Falk et al., "Non-Intrusive GMM-Based Speech Quality Measurement", IEEE International Conference on Acoustics, Speech, and Signal Processing, 2005 (ICASSP '05), Mar. 18-23, 2005, pp. 125 to 128.*

Falk et al., "Nonintrusive Speech Quality Estimation Using Gaussian Mixture Models", Signal Processing Letters, vol. 13, Issue 2, Feb. 2006, pp. 108 to 111.*

Falk et al., "Speech Quality Estimation Using Gaussian Mixture Models", Proceedings Interspeech 2004, Oct. 2004, pp. 2013 to 2016.*

Falk et al., "Single-Ended Speech Quality Measurement Using Machine Learning Methods", IEEE Transactions on Audio, Speech, and Language Processing, vol. 14, No. 6, Nov. 2006, pp. 1935 to 1947.*

* cited by examiner

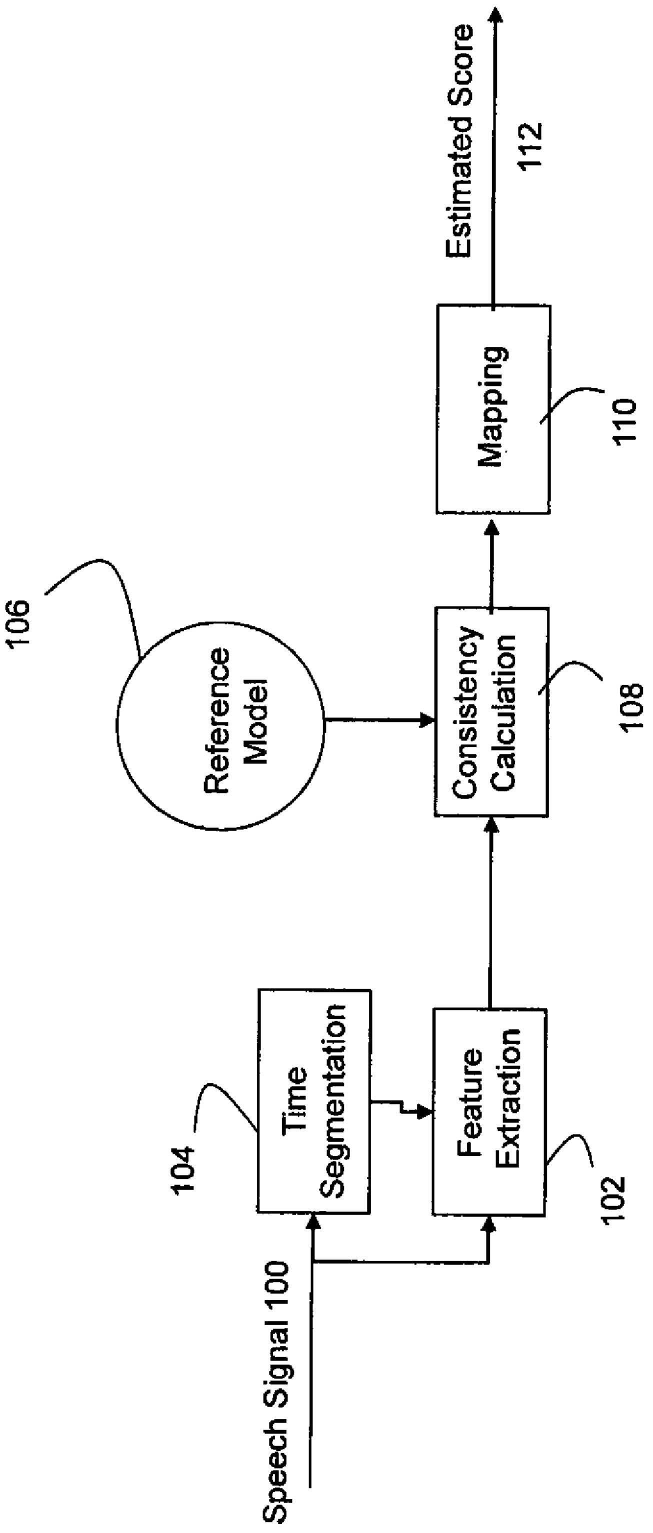
Speech Signal 100
Time Segmentation
104
Feature Extraction
102
Reference Model
106
Consistency Calculation
108
Mapping
110
Estimated Score
112

SINGLE-SIDED SPEECH QUALITY MEASUREMENT

CROSS-REFERENCE TO RELATED APPLICATIONS

This application is a continuation of U.S. patent application Ser. No. 11/364,252, titled Single-Sided Speech Quality Measurement, filed Feb. 28, 2006, now abandoned.

FIELD OF THE INVENTION

This invention relates generally to the field of telecommunications, and more particularly to double-ended measurement of speech quality.

BACKGROUND OF THE INVENTION

The capability of measuring speech quality in a telecommunications network is important to telecommunications service providers. Measurements of speech quality can be employed to assist with network maintenance and troubleshooting, and can also be used to evaluate new technologies, protocols and equipment. However, anticipating how people will perceive speech quality can be difficult. The traditional technique for measuring speech quality is a subjective listening test. In a subjective listening test a group of people manually, i.e., by listening, score the quality of speech according to, e.g., an Absolute Categorical Rating ("ACR") scale, Bad (1), Poor (2), Fair (3), Good(4), Excellent (5). The average of the scores, known as a Mean Opinion Score ("MOS"), is then calculated and used to characterize the performance of speech codecs, transmission equipment, and networks. Other kinds of subjective tests and scoring schemes may also be used, e.g., degradation mean opinion scores ("DMOS"). Regardless of the scoring scheme, subjective listening tests are time consuming and costly.

Machine-automated, "objective" measurement is known as an alternative to subjective listening tests. Objective measurement provides a rapid and economical means to estimate user opinion, and makes it possible to perform real-time speech quality measurement on a network-wide scale. Objective measurement can be performed either intrusively or non-intrusively. Intrusive measurement, also called double-ended or input-output-based measurement, is based on measuring the distortion between the received and transmitted speech signals, often with an underlying requirement that the transmitted signal be a "clean" signal of high quality. Non-intrusive measurement, also called single-ended or output-based measurement, does not require the clean signal to estimate quality. In a working commercial network it may be difficult to provide both the clean signal and the received speech signal to the test equipment because of the distances between endpoints. Consequently, non-intrusive techniques should be more practical for implementation outside of a test facility because they do not require a clean signal.

Several non-intrusive measurement schemes are known. In C. Jin and R. Kubichek. "Vector quantization techniques for output-based objective speech quality," in *Proc. IEEE Inf. Conf Acoustics, Speech, Signal Processing*, vol. 1, May 1996, pp. 491-494, comparisons between features of the received speech signal and vector quantizer ("VQ") codebook representations of the features of clean speech are used to estimate quality. In W. Li and R. Kubichek, "Output-based objective speech quality measurement using continuous hidden Markov models," in *Proc. 7th Inl. Strap. Signal Processing Applications*, vol. I. July 2003. pp. 389-392, the VQ codebook reference is replaced with a hidden Markov model. In P. Gray, M. P. Hollier. and R. E. Massara. "Non-intrusive speech-quality assessment using vocal-tract models," *Proc. Inst. Elect. Eng., Vision, Image. Signal Process., vol.* 147, no. 6, pp. 493-501, December 2000 and D. S. Kim. "ANIQUE: An auditory model for single-ended speech quality estimation," *IEEE Trans. Speech Audio Process.*, vol. 13, no. 5, pp. 821-831, September 2005, vocal tract modeling and modulation-spectral features derived from the temporal envelope of speech, respectively, provide quality cues for non-intrusive quality measurement. More recently, a non-intrusive method using neurofuzzy inference was proposed in G. Chen and V. Parsa, "Nonintrusive speech quality evaluation using an adaptive neurofuzzy inference system," *IEEE Signal Process. Lett.*, vol. 12, no. 5, pp. 403-106, May 2005. The International Telecommunications Union ITU-T P.563 standard represents the "state-of-the-art" algorithm, ITU-T P.563, Single Ended Method for Objective Speech Quality Assessment in Narrow-Band Telephony Applications, International Telecommunication Union, Geneva, Switzerland, May 2004. However, each of these known non-intrusive measurement schemes is computationally intensive relative to the capabilities of equipment which could currently be widely deployed at low cost. Consequently, a less computationally intensive non-intrusive solution would be desirable in order to facilitate deployment outside of test facilities.

SUMMARY OF THE INVENTION

In accordance with one embodiment of the invention, a single-ended speech quality measurement method comprises the steps of: extracting perceptual features from a received speech signal; assessing the perceptual features with at least one statistical model of the features to form indicators of speech quality; and employing the indicators of speech quality to produce a speech quality score.

In accordance with another embodiment of the invention, apparatus operable to provide a single-ended speech quality measurement, comprises: a feature extraction module operable to extract perceptual features from a received speech signal; a statistical reference model and consistency calculation module operable in response to output from the feature extraction module to assess the perceptual features to form indicators of speech quality; and a scoring module operable to employ the indicators of speech quality to produce a speech quality score.

One advantage of the inventive technique is reduction of processing requirements for speech quality measurement without significant degradation in performance. Simulations with Perceptual Linear Prediction ("PLP") coefficients have shown that the inventive technique can outperform P.563 by up to 44.74% in correlation R for SMV coded speech under noisy conditions. The inventive technique is comparable to P.563 under various other conditions. An average 40% reduction in processing time was obtained compared to P.563, with P.563 implemented using a quicker procedural computer language than the interpretive language used to run the inventive technique. Thus, the speedup that can be obtained from the inventive technique programmed with a procedural language such as C is expected to be much greater.

BRIEF DESCRIPTION OF THE FIGURES

FIG. 1 is a block diagram of a non-intrusive measurement technique including a statistical reference model.

DETAILED DESCRIPTION

FIG. 1 illustrates a relatively easily calculable non-intrusive measurement technique. The input is a speech ("test") signal for which a subjective quality score is to be estimated (100), e.g., a speech signal that has been processed by network equipment, transmitted on a communications link, or both. A feature extraction module (102) is employed to extract perceptual features, frame by frame, from the test signal. A time segmentation module (104) labels the feature vector of each frame as belonging to one of three possible segment classes: voiced, unvoiced, or inactive. In a separate process, statistical or probability models such as Gaussian Mixture Models are formed. The terms "statistical model" and "statistical reference model" as used herein encompass probability models, statistical probability models and the like, as those terms are understood in the art. Different models may be formed for different classes of speech signals. For instance, one class could be high-quality, undistorted speech signal. Other classes could be speech impaired by different types of distortions. A distinct model may be used for each of the segment classes in each speech signal class, or one single model may be used for a speech class with no distinction between segments. The different statistical models together comprise a reference model (106) of the behavior of speech features. Features extracted from the test signal (100) are assessed using the reference model by calculating a "consistency" measure with respect to each statistical model via a consistency calculation module (108). The consistency values serve as indicators of speech quality and are mapped to an estimated subjective score, such as Mean Opinion Score ("MOS"), degradation mean opinion score ("DMOS"), or some other type of subjective score, using a mapping module (110), thereby producing an estimated score (112).

Referring now to the feature extraction module (102), perceptual linear prediction ("PLP") cepstral coefficients serve as primary features and are extracted from the speech signal every 10 ms. The coefficients are obtained from an "auditory spectrum" constructed to exploit three psychoacoustic precepts: critical band spectral resolution, equal-loudness curve, and intensity loudness power law. The auditory spectrum is approximated by an all-pole auto-regressive model, the coefficients of which are transformed to PLP cepstral coefficients. The order of the auto-regressive model determines the amount of detail in the auditory spectrum preserved by the model. Higher order models tend to preserve more speaker-dependent information. Since the illustrated embodiment is directed to measuring quality variation due to the transmission system rather than the speaker, speaker independence is a desirable property. In the illustrated embodiment fifth-order PLP coefficients as described in H. Hermansky, "Perceptual linear prediction (PLP) analysis of speech," J. *Acoust. Soc. Amer*., vol. 87, pp. 1738-1752, 1990, ("Hermansky"), which is incorporated by reference, are employed as speaker-independent speech spectral parameters. Other types of features, such as RASTA-PLP, may also be employed in lieu of PLP.

Referring now to the time segmentation module (104), time segmentation is employed to separate the speech frames into different classes. Each class appears to exert different influence on the overall speech quality. Time segmentation is performed using a voice activity detector ("VAD") and a voicing detector. The VAD identifies each 10-ms speech frame as being active or inactive. The voicing detector further labels active frames as voiced or unvoiced. In the illustrated embodiment the VAD from ITU-T Rec. G.729-Annex B, A Silence Compression Scheme for G.729 Optimized for Terminals Conforming to Recommendation V.70, International Telecommunication Union, Geneva, Switzerland. November 1996, which is incorporated by reference, is employed.

Referring to the GMM reference model (106), where u is a K-dimensional feature vector, a Gaussian mixture density is a weighted sum of M component densities as $$p(u \mid \lambda) = \sum_{i=1}^{M} \alpha_i b_i(u) \qquad \text{(Eq. 1)}$$

where $\alpha_i \geq 0$, i=1, . . . , M are the mixture weights, with $\Sigma_{i=1}^{M} \alpha_i = 1$, and $b_i(u)$, i=1, . . . , M, are K-variate Gaussian densities with mean vector $\mu_i$ and covariance matrix $\Sigma_i$. The parameter list $\lambda=\{\lambda_1, \ldots, \lambda_M\}$ defines a particular Gaussian mixture density, where $\lambda_i=\{\mu_i, \Sigma_i, \alpha_i\}$. GMM parameters are initialized using the k-means algorithm described in A. Gersho and R. Gray, *Vector Quantization and Signal Compression*. Norwell, M A: Kluwer, 1992, which is incorporated by reference, and estimated using the expectation-maximization ("EM") algorithm described in A. Dempster, N. Lair, and D. Rubin, "Maximum likelihood from incomplete data via the EM algorithm," *J. Royal Statistical Society*, vol.~39, pp. 1-38, 1977, which is incorporated by reference. The EM algorithm iterations produce a sequence of models with monotonically non-decreasing log-likelihood ("LL") values. The algorithm is deemed to have converged when the difference of LL values between two consecutive iterations drops below $10^{-3}$.

Referring specifically to the reference model (106), a GMM is used to model the PLP cepstral coefficients of each class of speech frames. For instance, consider the class of clean speech signals. Three different Gaussian mixture densities $p_{class}(u|\lambda)$ are trained. The subscript "class" represents either voiced, unvoiced, or inactive frames. In principle, by evaluating a statistical model at the PLP cepstral coefficients x of the test signal, i.e., $p_{class}(x|\lambda)$, a measure of consistency between the coefficient vector and the statistical model is obtained. Voiced coefficient vectors are applied to $p_{voiced}(u|\lambda)$, unvoiced vectors to $p_{unvoiced}(u|\lambda)$, and inactive vectors to $p_{inactive}(u|\lambda)$.

Referring now to the consistency calculation module (108), it should be noted that a simplifying assumption is made that vectors between frames are independent. Improved performance might be obtained from more sophisticated approaches that model the statistical dependency between frames, such as Markov modeling. Nevertheless, a model with low computational complexity has benefits as already discussed above. For a given speech signal whose feature vectors have been classified as described above, the consistency between the feature vectors of a class and the statistical model of that class is calculated as $$c_{class}(x_1, \ldots, x_{N_{class}}) = \frac{1}{N_{class}} \sum_{j=1}^{N_{class}} \log(p_{class}(x \mid \lambda)) \qquad \text{(Eq. 2)}$$

where $x_1, \ldots, x_{Nclass}$, are the feature vectors in the class, and $N_{class}$ is the number of such vectors in the statistical model class. Larger $C_{class}$ indicates greater consistency. $C_{class}$ is set to zero whenever $N_{class}$ is zero. For each class, the product of the consistency measure $C_{class}$ and the fraction of frames of that class in the speech signal is calculated. The products for all the model classes serve as quality indicators to be mapped to an objective estimate of the subjective score value.

Referring now to the mapping module (110), mapping functions which may be utilized include multivariate polynomial regression and multivariate adaptive regression splines ("MARS"), as described in J.H. Friedman, "Multivariate adaptive regression splines," *The Annals of Statistics*, vol. 19, no 1, pp. 1-141, March 1991. With MARS, the mapping is constructed as a weighted sum of basis functions, each taking the form of a truncated spline.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative structures, one skilled in the art will recognize that the system may be embodied using a variety of specific structures. Accordingly, the invention should not be viewed as limited except by the scope and spirit of the appended claims.

What is claimed is:

1. A single-ended speech quality measurement method comprising the steps of:

for each frame of a plurality of frames containing a speech signal that has been processed by network equipment, transmitted on a communications link, or both:

extracting perceptual features; and classifying the frame based on the perceptual features into a class selected from a set of classes including voiced and unvoiced; and for the frames of each class:

assessing the perceptual features with a statistical model of that class to generate an indicator of speech quality, the statistical model of that class being part of a reference model which includes at least one statistical model for each class of the set of classes, the reference model generated prior to extracting the perceptual features to form indicators of speech quality, including assessing at least some unvoiced frames; and employing the indicators of speech quality from different classes to produce an estimate of subjective speech quality score without reference to a corresponding speech signal that has not been processed by network equipment, transmitted on a communications link, or both.

2. The method of claim 1 including the further step of separately modeling a probability distribution of the features for each frame class and different classes of speech signals with statistical models.

3. The method of claim 2 wherein the classes include inactive.

4. The method of claim 2 including the further step of calculating a consistency measure indicative of speech quality for each class separately with a plurality of statistical models.

5. The method of claim 4 including the further step of employing the consistency measures to obtain an estimate of subjective scores.

6. The method of claim 5 including the further step of mapping the consistency measures to a speech quality score using a mapping comprising Multivariate Adaptive Regression Splines.

7. The method of claim 1 wherein the perceptual features are assessed with Gaussian Mixture Models to form indicators of speech quality.

8. Apparatus operable to provide a single-end speech quality Measurement, comprising:

a feature extraction module which extracts, frame-by-frame, perceptual features from a received speech signal that has been processed by network equipment, transmitted on a communications link, or both;

a time segmentation module which classifies each frame based on the perceptual features into a class selected from a set of classes including voiced and unvoiced;

a statistical reference model generated prior to extraction of the perceptual features, the reference model including at least one statistical model for each class of the set of classes;

a consistency calculation module which, for the frames of each class, operates in response to output from the feature extraction module to assess the perceptual features with a statistical model of that class to form indicators of subjective speech quality without reference to a corresponding speech signal that has not been processed by network equipment, transmitted on a communications link, or both, including assessing at least some unvoiced frames; and a scoring module which employs the indicators of speech quality from different classes to produce a speech quality score without reference to a corresponding speech signal that has not been processed by network equipment, transmitted on a communications link, or both.

9. The apparatus of claim 8 wherein the consistency calculation module is further operable to separately model a probability distribution of the features for each class and different classes of speech signals with the statistical models.

10. The Apparatus of claim 9 wherein the classes include inactive.

11. The apparatus of claim 9 wherein the consistency calculation module is further operable to calculate a consistency measure indicative of speech quality for each class separately with a plurality of Gaussian Mixture Models.

12. The apparatus of claim 11 further including a mapping module operable to employ the consistency measures to obtain an estimate of subjective scores.

13. The apparatus of claim 12 wherein the mapping module employs a mapping optimized using Multivariate Adaptive Regression Splines.

14. The apparatus of claim 8 wherein the statistical reference model includes Gaussian Mixture Models.

* * * * *